United States Patent
Li et al.

(10) Patent No.: US 8,845,974 B2
(45) Date of Patent: Sep. 30, 2014

(54) ADVANCED CATALYZED SOOT FILTERS AND METHOD OF MAKING AND USING THE SAME

(75) Inventors: Yuejin Li, Edison, NJ (US); Stanley A. Roth, Yardley, PA (US); Alfred H. Punke, Schwulper (DE); Gary A. Gramiccioni, Madison, AL (US)

(73) Assignee: BASF Corporation, Florham Park, NJ (US)

( * ) Notice: Subject to any disclaimer, the term of this patent is extended or adjusted under 35 U.S.C. 154(b) by 484 days.

(21) Appl. No.: 12/954,067

(22) Filed: Nov. 24, 2010

(65) Prior Publication Data

US 2012/0124974 A1    May 24, 2012

(51) Int. Cl.
*B01D 50/00* (2006.01)
*B01J 38/06* (2006.01)
*B01J 38/08* (2006.01)

(52) U.S. Cl.
USPC .............................. 422/177; 502/65; 502/66

(58) Field of Classification Search
USPC ......................................... 422/168, 177, 180
See application file for complete search history.

(56) References Cited

U.S. PATENT DOCUMENTS

| | | |
|---|---|---|
| 5,221,484 A | 6/1993 | Goldsmith et al. |
| 7,119,044 B2 | 10/2006 | Wei et al. |
| 2007/0137187 A1 | 6/2007 | Kumar |
| 2008/0127638 A1 | 6/2008 | Vaarkamp et al. |
| 2009/0087365 A1 | 4/2009 | Klingmann et al. |
| 2009/0155135 A1* | 6/2009 | Li ................... 422/180 |
| 2009/0193796 A1* | 8/2009 | Wei et al. ............ 60/297 |
| 2010/0058745 A1 | 3/2010 | Kim |
| 2010/0236224 A1 | 9/2010 | Kumar et al. |

FOREIGN PATENT DOCUMENTS

JP    03130522    6/1991
WO    WO-2009/043390    4/2009

* cited by examiner

*Primary Examiner* — Tom Duong
(74) *Attorney, Agent, or Firm* — Melanie L. Brown

(57) ABSTRACT

Catalyzed soot filters comprising a wall flow monolith having porous walls, a first washcoat permeating the porous walls and a second washcoat on the porous walls are disclosed. Methods of manufacturing catalyzed soot filters and diesel engine exhaust emission treatment systems are also disclosed.

15 Claims, 5 Drawing Sheets

ADVANCED CATALYZED SOOT FILTERS AND METHOD OF MAKING AND USING THE SAME

TECHNICAL FIELD

Catalyzed soot filters for diesel engine exhaust emissions systems and methods for their manufacture and use are disclosed. More specifically, catalyzed soot filters having a first washcoat permeating the walls of a wall flow monolith and a second washcoat disposed on the walls of the wall flow monolith are described.

BACKGROUND

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of NOx.

The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of TPM.

There are many known filter structures that are effective in removing particulate matter from diesel exhaust, such as honeycomb wall flow filters, wound or packed fiber filters, open cell foams, sintered metal filters, etc. However, ceramic wall flow filters receive the most attention. These filters are capable of removing over 90% of the particulate material from diesel exhaust. The filter is a physical structure for removing particles from exhaust, and the accumulating particles will increase the back pressure from the filter on the engine. Thus, the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than what is typically present in diesel exhaust.

Catalyst compositions and substrates on which the compositions are disposed are typically provided in diesel engine exhaust systems to convert certain or all of these exhaust components to innocuous components. For instance, oxidation catalysts, which may be referred to as diesel oxidation catalysts (DOCS), containing platinum group metals, base metals and combinations thereof, facilitate the treatment of diesel engine exhaust by promoting the conversion of both unburned hydrocarbons (HC) and carbon monoxide (CO) gaseous pollutants, and some proportion of the particulate matter through oxidation of these pollutants to carbon dioxide and water. Such catalysts have generally been disposed on various substrates (e.g., honeycomb flow through monolith substrates), which are placed in the exhaust of diesel engines to treat the exhaust before it vents to the atmosphere. Certain oxidation catalysts also promote the oxidation of NO to $NO_2$.

Automotive manufacturers are seeking to reduce the size of diesel oxidation catalysts disposed on flow through honeycomb substrates to aid in placing the DOC in a close coupled position closer to the engine. As a result, the decreased size of the DOC, cannot fully oxidize hydrocarbons and carbon monoxide to meet emissions requirements. As a result, there is a need to provide catalyzed soot filters that can assist in the oxidation of hydrocarbons and carbon monoxide to meet increasingly stringent emissions requirements.

SUMMARY

One or more embodiments of the invention are directed to catalyzed soot filters comprising a wall flow monolith, a first washcoat and a second washcoat. The wall flow monolith has a plurality of longitudinally extending passages formed by longitudinally extending porous walls bounding and defining said passages. The passages comprise inlet passages having an open inlet end and closed outlet end, and outlet passages having a closed inlet end and an open outlet end. The first washcoat permeates the walls of the wall flow monolith. The second washcoat is disposed on the walls of the passages of the wall flow monolith. The first washcoat comprises one of (1) platinum and palladium on refractory metal oxide support particles or (2) zeolite and alumina; and the second washcoat comprises the other of (1) platinum and palladium on refractory metal oxide support particles or (2) zeolite and alumina.

Additional embodiments of the invention are directed to exhaust treatment systems comprising a diesel engine in flow communication with the catalyzed soot filter. Detailed embodiments further comprise one or more catalyst positioned between the diesel engine and the catalyzed soot filter and in flow communication with both. In further embodiments, the exhaust treatment system further comprises one or more catalysts positioned downstream of and in flow communication with the catalyzed soot filter.

In detailed embodiments, the second washcoat is disposed on the walls of the inlet passages. In specific embodiments, the second washcoat is disposed on the walls of the outlet passages.

In some embodiments, the platinum is present with a loading in a range of about 0.5 g/ft$^3$ and about 80 g/ft$^3$. In one or more embodiments, the palladium is present with a loading in a range of about 0.5 g/ft$^3$ and about 80 g/ft$^3$.

According to some embodiments, the washcoat comprising zeolite and alumina comprises zeolite in a range of about 0.05 g/in$^3$ to about 0.3 g/in$^3$ and alumina in a range of about 0.2 g/in$^3$ to about 0.5 g/in$^3$.

In detailed embodiments, the washcoat comprising zeolite and alumina further comprises palladium supported on an oxygen storage component (OSC). In specific embodiments, the palladium is present with a loading in a range of about 0.5 g/ft$^3$ and about 30 g/ft$^3$.

In specific embodiments, the wall flow monolith comprises cordierite having a porosity in a range of about 40% to about 70% and a mean pore size in a range of about 10 μm and 30 μm.

Further embodiments of the invention are directed to methods of making a catalyst-coated wall flow monolith. A wall flow monolith having a plurality of longitudinally extending passages formed by longitudinally extending porous walls bounding and defining said passages is provided. The passages comprise inlet passages having an open inlet end and closed outlet end, and outlet passages having a closed inlet end and an open outlet end. The porous walls of the wall flow monolith have a mean pore size. A first washcoat slurry is prepared. The first washcoat slurry comprises one of (1) a platinum group metal on refractory metal oxide support particles dispersed in water or (2) zeolite and alumina dispersed in water. The first washcoat slurry has solids with a mean particle size less than or equal to about the mean pore size of the porous walls. A coating of the first washcoat slurry is dispersed so that the first washcoat slurry penetrates the porous walls of the wall flow monolith. The wall flow monolith is dried and calcined. A second washcoat slurry is prepared. The second washcoat slurry comprises the other of (1) a platinum group metal on refractory metal oxide support particles dispersed in water or (2) zeolite and alumina dispersed in water. The second washcoat slurry has solids with a mean particle size greater than or equal to about the mean pore size of the porous walls. A coating is applied on the passages walls of the wall flow monolith with a second washcoat slurry. The wall flow monolith is dried and calcined.

In detailed embodiments, the washcoat slurry comprising zeolite and alumina dispersed in water further comprises at least one platinum group metal impregnated on an OSC. In specific embodiments, preparing the washcoat slurry comprising zeolite and alumina dispersed in water comprises impregnating the OSC with a palladium solution by an incipient wetness technique and dispersing the impregnated OSC in water before adding the zeolite and the alumina. In further embodiments, preparing the second washcoat slurry further comprises adding at least one of an associative thickener and a surfactant to the slurry.

One or more embodiments of the invention are directed to methods of treating an exhaust gas stream comprising hydrocarbons, carbon monoxide and particulate matter. The exhaust gas stream is contacted with a second washcoat disposed on the walls of the wall flow monolith. The second washcoat comprises one of (1) a platinum group metal on refractory metal oxide support particles dispersed in water or (2) zeolite and alumina dispersed in water. The exhaust gas stream is contacted with a first washcoat permeating walls of a wall flow monolith. The first washcoat comprises the other of one of (1) a platinum group metal on refractory metal oxide support particles dispersed in water or (2) zeolite and alumina dispersed in water.

In detailed embodiments, the exhaust gas stream contacts the first washcoat before the second washcoat. In specific embodiments, the exhaust gas stream contacts the second washcoat before the first washcoat.

In some embodiments, the washcoat comprising zeolite and alumina dispersed in water further comprises palladium supported on an oxygen storage component (OSC).

DETAILED DESCRIPTION

Figure 1:
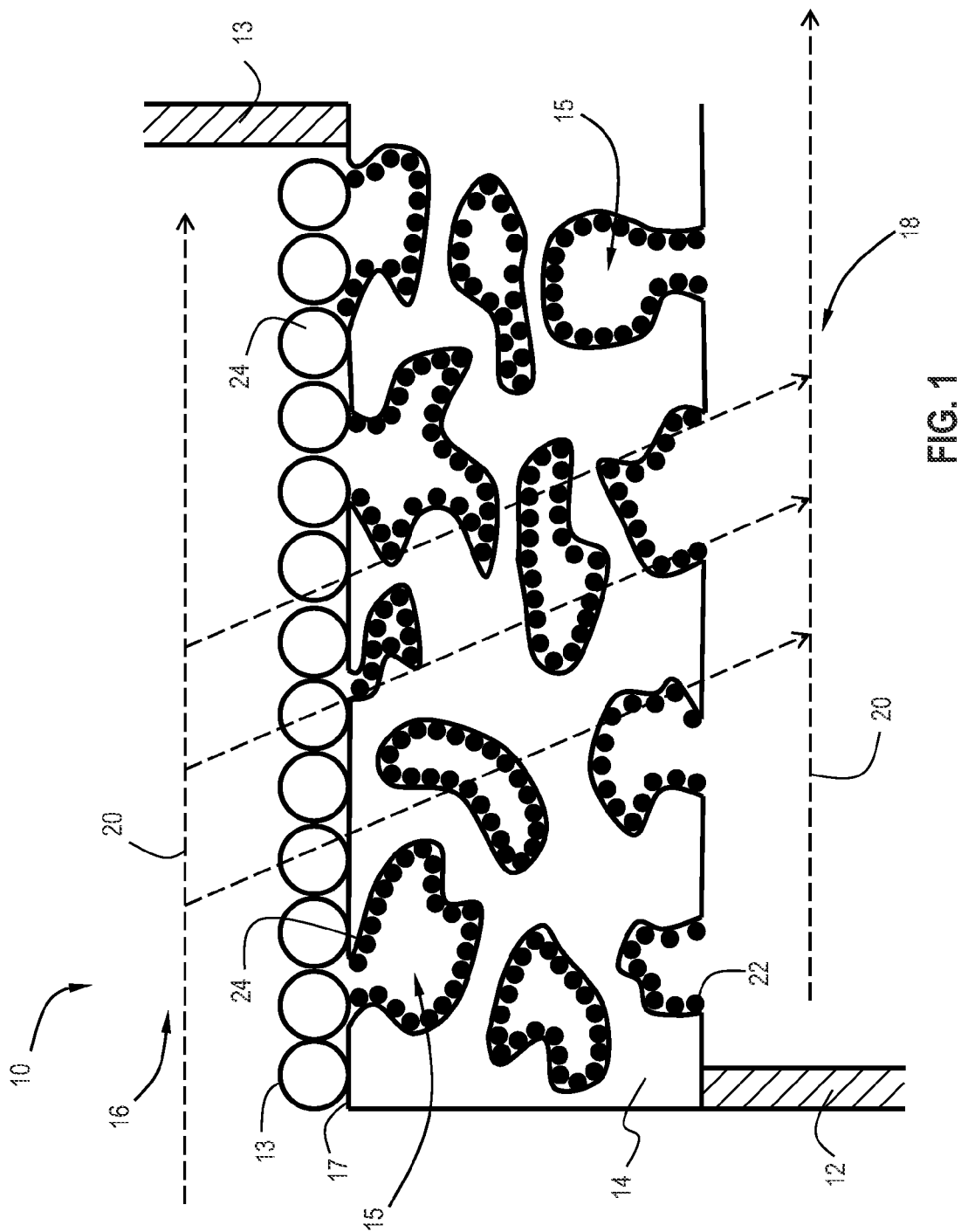
FIG. 1 shows a partial cross-section of a catalyzed soot filter in accordance with one or more embodiments of the invention.

Before describing several exemplary embodiments of the invention, it is to be understood that the invention is not limited to the details of construction or process steps set forth in the following description. The invention is capable of other embodiments and of being practiced or being carried out in various ways.

The following terms shall have, for the purposes of this application, the respective meanings set forth below.

The terms "exhaust stream", "engine exhaust stream", "exhaust gas stream" and the like refer to the engine out effluent as well as to the effluent downstream of one or more other catalyst system components including but not limited to a catalyzed soot filter "Refractory metal oxides" refer to alumina, silica, zirconia, titania, ceria, and physical mixtures or chemical combinations thereof, including atomically doped combinations.

"Platinum group metal components" refer to platinum group metals or one of their oxides.

"Rare earth metal" refer to one or more oxides of the lanthanum series defined in the Periodic Table of Elements, including lanthanum, cerium, praseodymium and neodymium.

"Washcoat" has its usual meaning in the art of a thin, adherent coating of a catalytic or other material applied to a refractory substrate, such as a honeycomb flow through monolith substrate or a filter substrate, which is sufficiently porous to permit the passage there through of the gas stream being treated. As used herein and as described in Heck, Ronald and Robert Farrauto, *Catalytic Air Pollution Control*, New York: Wiley-Interscience, 2002, pp. 18-19, a washcoat layer includes a compositionally distinct layer of material disposed on the surface of the monolithic substrate or an underlying washcoat layer. A catalytic article can contain one or more washcoat layers, and each washcoat layer can have unique chemical catalytic functions.

"Flow communication" means that the components and/or conduits are adjoined such that exhaust gases or other fluids can flow between the components and/or conduits.

"Downstream" refers to a position of a component in an exhaust gas stream in a path further away from the engine than the component preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relative to another component.

Embodiments of the invention are directed to methods of making a catalyzed soot filter which has an improved oxidation activity for CO and hydrocarbons. A conventional catalyzed soot filter has catalyst coating placed inside the void space of the porous filter walls, where every component is intimately mixed within the wall. One or more embodiments of the invention have the main precious metal component, such as platinum and palladium, placed within the porous walls of the filter. A separate, thin layer (or partial layer) of zeolite and/or oxygen storage component is coated on the top of the filter wall. By doing so, the oxidation activity of the filter is greatly enhanced compared to the standard coating method having the same composition.

Figure 2:
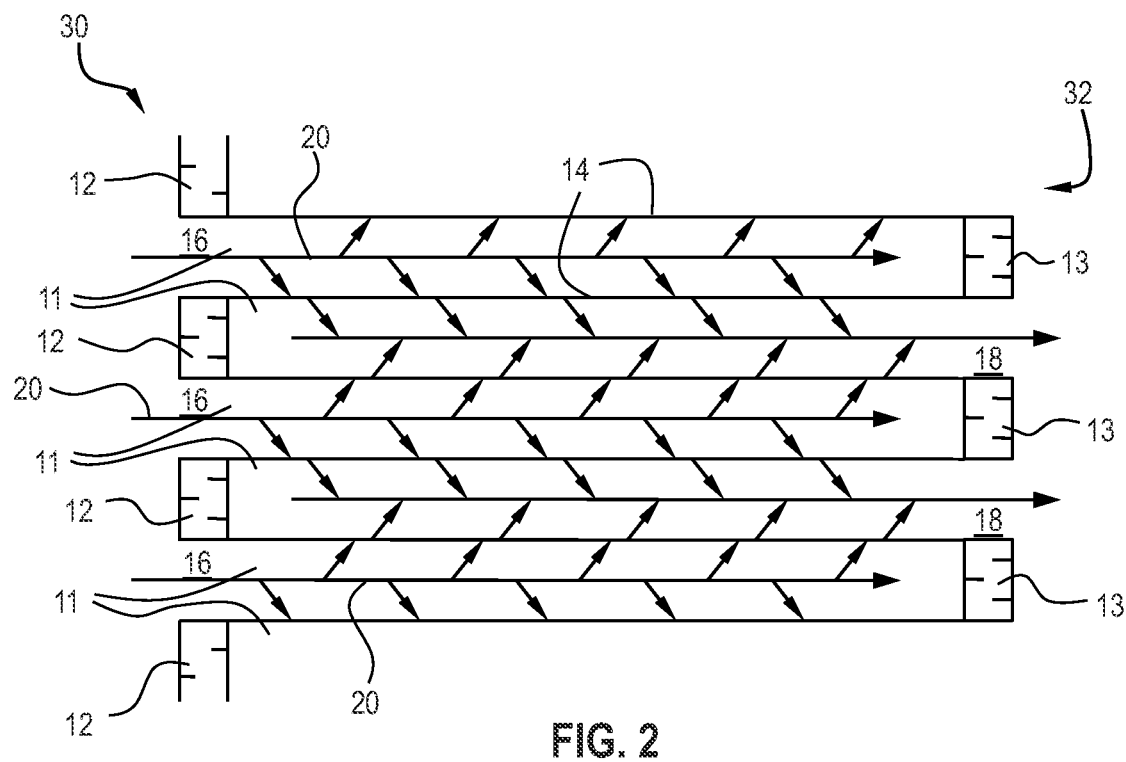
FIG. 2 shows a partial cross-section of a wall flow monolith in accordance with one or more embodiments of the invention.
Figure 3:
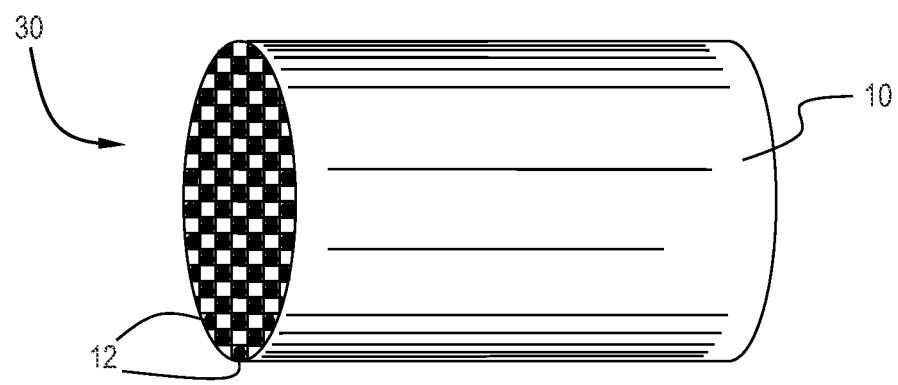
FIG. 3 shows a perspective view of a wall flow filter substrate.

One or more embodiments of the invention are directed to catalyzed soot filters, as shown in FIGS. 1 through 3. The catalyzed soot filter comprises a wall flow monolith 10 which has a plurality of longitudinally extending passages formed by longitudinally extending porous walls 14 bounding and defining said passages. FIGS. 1 and 2 show partial cross-sections of a wall flow monolith 10, also referred to as a wall flow filter substrate, showing inlet passages 16, outlet passages 18 and porous walls 14. It should be understood that a wall flow monolith 10 generally comprises a plurality of the passages shown in FIGS. 1 and 2.

The wall flow monolith 10 shown has a plurality of alternately blocked passages 11, also referred to as channels, and can serve as a particulate filter. The wall flow monolith 10 has an inlet end 30 and an outlet end 32. The inlet passages 16 of the wall flow monolith 10 have an open inlet end and an outlet end 32 which has an outlet plug 13 which is effective to prevent gas flow from passing through the outlet end 32 of the inlet passages 16. The outlet passages 18 have an inlet plug 12 at the inlet end and an open outlet end. Alternate passages 11 are plugged at opposite ends to form a checkerboard pattern at the inlet end 30 and outlet end 32. This configuration forces a gas flow 20 to enter the wall flow monolith 10 through the open ends of the inlet passages 16. The gas flow 20 is stopped by the outlet plugs 13 and is forced to diffuse through the porous wall 14 to the outlet passage 18. The gas flow 20 cannot pass back to the inlet passage 16 because of the inlet plugs 12.

Each of the porous walls 14 of the wall flow monolith 10 has a plurality of pores 15. FIG. 1 shows a partial cross-section which shows the pores 15 as being simple openings within the porous wall 14. However, it will be understood by those skilled in the art that the pores 15 twist and turn throughout the entire three-dimensional structure of the porous walls 14 where they may connect to the surface 17 of the porous wall 14. A first washcoat 22 permeates the porous walls 14 of the wall flow monolith 10 coating the surface of the pores 15. The first washcoat 22 is selected from one of (1) platinum and palladium on refractory metal oxide support particles; or (2) zeolite and alumina. A second washcoat 24 is disposed on the surface 17 of the porous walls 14 of the passages of the wall flow monolith 10. The second washcoat 24 comprises the other of (1) platinum and palladium on refractory metal oxide support particles; or (2) zeolite and alumina. As will be appreciated, in one embodiment, the platinum and palladium containing washcoat permeates the porous walls while the zeolite and alumina containing washcoat is disposed on the surface of the porous walls. In an alternate embodiment, the zeolite and alumina containing washcoat permeates the porous walls while the platinum and palladium containing washcoat is disposed on the surface of the porous walls.

In the embodiment shown in FIG. 1, the second washcoat 24 is located on the surface 17 of the porous walls 14 on the inlet passages 16. This is merely illustrative and is not intended to limit the scope of the invention. In alternate embodiments (not shown) the second washcoat 24 is located on the surface 17 of the porous walls 14 of the outlet passages 18. This can be envisioned by reversing the direction of the gas flow 20 arrows, which would result in the inlet passages 16 and the outlet passages 18 being switched.

In specific embodiments, the second washcoat 24 is located on the surface 17 of the porous walls 14 of both the inlet passages 16 and the outlet passages 18. In these situations, the specific composition of the second washcoat 24 on the porous walls 14 of the inlet passages 16 can be the same or differ from that of the second washcoat 24 on the porous walls 14 of the outlet passages 18. Further description of the composition of the second washcoat 24 is described below.

The wall flow monolith can be any suitable material known to those skilled in the art. Non-limiting examples of suitable wall flow monolith materials include cordierite, silicon carbide, aluminum titanate, alumina and mullite. The porosity of the wall flow monolith can also be varied depending on the desired properties of the resultant filter. In detailed embodiments, the porosity of the monolith is in the range of about 40% to about 70%. In specific embodiments, the porosity of the monolith is about 50%. The mean pore size of the monolith can also be varied, and does vary depending on the monolith material. In some embodiments, the monolith has a mean pore size in a range of about 10 μm and 30 μm.

The loading of the platinum and palladium in the first washcoat 22 can vary. In detailed embodiments the platinum is present with a loading in a range of about 0.5 g/ft$^3$ and about 80 g/ft$^3$. In one or more embodiments, the platinum is present with a loading in the range of about 0.5 and about 30 g/ft$^3$, or in the range of about 1 g/ft$^3$ and about 30 g/ft$^3$, or in the range of about 0.75 g/ft$^3$ and about 60 g/ft$^3$ or in the range of about 1.5 g/ft$^3$ and about 15 g/ft$^3$. In various embodiments, the loading of platinum in the first washcoat 22 is greater than or equal to about 0.5 g/ft$^3$, 0.75 g/ft$^3$, 1 g/ft$^3$, 1.25 g/ft$^3$, 1.5 g/ft$^3$, 1.75 g/ft$^3$, 2 g/ft$^3$, 3 g/ft$^3$, 4 g/ft$^3$, 5 g/ft$^3$, 6 g/ft$^3$, 7 g/ft$^3$, 8 g/ft$^3$, 9 g/ft$^3$, 10 g/ft$^3$, 15 g/ft$^3$ or 20 g/ft$^3$.

In detailed embodiments, the palladium is present with a loading in a range of about 0.5 g/ft$^3$ and about 80 g/ft$^3$. In one or more embodiments, the palladium is present with a loading in the range of about 0.5 and about 30 g/ft$^3$, or in the range of about 0.5 g/ft$^3$ to about 15 g/ft$^3$, or in the range of about 1 g/ft$^3$ and about 80 g/ft$^3$, or in the range of about 1 g/ft$^3$ and 30 80 g/ft$^3$ or in the range of about 1 g/ft$^3$ and about 15 g/ft$^3$. In various embodiments, the loading of palladium in the first washcoat 22 is greater than or equal to about 0.5 g/ft$^3$, 1 g/ft$^3$, 1.5 g/ft$^3$, 2 g/ft$^3$, 3 g/ft$^3$, 4 g/ft$^3$ or 5 g/ft$^3$.

The support particles in the washcoat containing platinum and palladium can be comprise any support known to those skilled in the art. In detailed embodiments, the support particles in the washcoat containing platinum and palladium can comprise one or more refractory metal oxide. In specific embodiments, the refractory metal oxide is on or more of alumina, silica, titania and zirconia. The size of the support particles in the washcoat containing platinum and palladium can vary depending on the mean pore diameter of the wall flow monolith. In embodiments in which the platinum and palladium washcoat permeates the walls of the wall flow monolith, to ensure that the first washcoat 22 permeates the porous wall 14 of the wall flow monolith, it may be useful to have the particle size of the support less than the mean pore diameter of the wall flow monolith. In detailed embodiments, the support particles have a $D_{90}$ of less than or equal to about 10 μm. The $D_{90}$ is defined size at which about 90% of the particles have a finer particle size. In specific embodiments, the support particles in the first washcoat have a $D_{90}$ less than or equal to about 9 μm, 8 μm, 7 μm, 6 μm or 5 μm. In one or more embodiments, the $D_{90}$ of the first washcoat 22 is equal to or less than the $D_{90}$ of the second washcoat 24.

The zeolite in the washcoat containing zeolite and alumina can be any suitable zeolite. In detailed embodiments the zeolite is one or more of alpha-zeolite, beta-zeolite and Y-zeolite. In specific embodiments, the zeolite is beta-zeolite. In detailed embodiments, the zeolite is present in an amount in the range of about 0.05 $g/in^3$ to about 0.3 $g/in^3$. In some embodiments, the zeolite is present in amount in the range of about 0.1 $g/in^3$ to about 0.2 $g/in^3$. In various embodiments, the zeolite is present in an amount greater than or equal to about 0.05 $g/in^3$, 0.1 $g/in^3$, 0.15 $g/in^3$, 0.2 $g/in^3$ or 0.25 $g/in^3$. In specific embodiments, the zeolite is present at about 0.1 $g/in^3$.

The alumina in the washcoat containing zeolite and alumina is present in amount in the range of about 0.2 $g/in^3$ to about 0.5 $g/in^3$. In some embodiments, the alumina is present in an amount in the range of about 0.3 $g/in^3$ to about 0.4 $g/in^3$. In various embodiments, the alumina is present in an amount greater than or equal to about 0.2 $g/in^3$, 0.3 $g/in^3$ or 0.4 $g/in^3$. In specific embodiments, the alumina is present at about 0.5 $g/in^3$.

In specific embodiments, the washcoat containing zeolite and alumina comprises a zeolite in the range of about 0.05 $g/in^3$ to about 0.3 $g/in^3$ and alumina in a range of about 0.2 $g/in^3$ to about 0.5 $g/in^3$.

In some embodiments, the washcoat containing alumina an zeolite further comprises a platinum group metal supported on an oxygen storage component (OSC). The platinum group metal can be any suitable platinum group metal. In specific embodiments, the platinum group metal in the washcoat containing zeolite and alumina is palladium. The oxygen storage component can be any suitable OSC material known in the art. In detailed embodiments, the OSC is one or more of ceria, ceria-containing compounds and rare earth metal-containing compounds. The OSC can be present in an amount in the range of about 0.05 $g/in^3$ and about 0.2 $g/in^3$.

The amount of palladium supported on the OSC in the washcoat containing zeolite and alumina can be varied depending on the desired properties of the catalyzed soot filter. In detailed embodiments, the palladium is present in an amount in the range of about 0.5 $g/ft^3$ and about 30 $g/ft^3$. In some embodiments, the palladium is present in the second washcoat 24 in an amount in the range of about 0.5 $g/ft^3$ to about 15 $g/ft^3$, or in a range of about 1 $g/ft^3$ to about 15 $g/ft^3$. In various embodiments, palladium is present in an amount greater than or equal to about 0.05 $g/ft^3$, 1 $g/ft^3$, 2 $g/ft^3$, 3 $g/ft^3$, 4 $g/ft^3$, 5 $g/ft^3$, 10 $g/ft^3$ or 15 $g/ft^3$. In specific embodiments, palladium is present in amount about 15 $g/ft^3$ in the washcoat containing zeolite and alumina.

The second washcoat 24 may also include other components including, but not limited to, associative thickeners and surfactants. Associative thickeners may be added to increase the viscosity of the second washcoat 24. Surfactants may be added to the second washcoat 24 to reduce the surface tension. Surfactants suitable for use with the second washcoat can be anion, cationic, non-ionic or amphoteric. Suitable associative thickeners according to one or more embodiments include polymers hydrophobic ethoxylated urethane, which may be referred to as associative polymers. Suitable associative thickeners include HEUR (hydrophobic ethoxylated urethane) which are called associative polymers available from Byk Chemie, Rohm and Haas Company and BASF. In one or more embodiments, associative thickeners with a high pseudoplastic index (high viscosity without shear), or highly shear thinning associative thickeners are useful. In one embodiment, the associative thickener has a stable pH range and is non-ionic nature. Suitable surfactants according to one or more embodiments include nonionic surfactants, that exhibit wetting, defoaming and dispersion in slurries. In specific embodiments. In one or more embodiments, the associative thickener and the surfactant are synergistic such that the associative thickener prefers a low HLB (Hydrophobic Lipophilic Balance), which facilitates viscosity build without shear. Suitable surfactants can be obtained from BASF, Lubrizol, Air Products, and AKZO Nobel.

Specific embodiments of the catalyzed soot filter have a first washcoat 22 comprising about 20 $g/ft^3$ platinum and about 10 $g/ft^3$ palladium supported on alumina. The second washcoat 24 is disposed on the walls of the inlet passages and comprises about 10 $g/ft^3$ palladium supported on an oxygen storage component, about 0.1 $g/in^3$ beta-zeolite and about 0.05 $g/in^3$ alumina.

The Substrate

According to one or more embodiments, the substrate for the catalyst may be any of those materials typically used for preparing automotive catalysts and will typically comprise a metal or ceramic honeycomb structure. Wall flow substrates according to one or more embodiments have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Specific embodiments of wall flow substrates have a wall thickness of between 0.002 and 0.015 inches. However, it will be understood that the invention is not limited to a particular substrate type, material, or geometry.

Ceramic substrates may be made of any suitable ceramic or metallic material. Exemplary ceramic materials include, but are not limited to, cordierite, cordierite-α alumina, silicon nitride, zircon mullite, spodumene, alumina-silica magnesia, zircon silicate, sillimanite, magnesium silicates, zircon, petalite, α alumina, aluminosilicates and the like. Exemplary metallic supports include the heat resistant metals and metal alloys such as titanium and stainless steel as well as other alloys in which iron is a substantial or major component.

The porosity of the substrate can be tailored depending on the desired catalyzed soot filter properties. In specific embodiments the porosity of the wall flow monolith is in the range of about 11 μm to about 23 μm.

Method of Preparing a Catalyst

Additional embodiments of the invention are directed to methods of making a catalyzed soot filter. A first washcoat slurry comprising one of (1) a platinum group metal on refractory metal oxide support particles dispersed in water; or (2) zeolite and alumina dispersed in water is prepared. The first washcoat slurry has solids with a mean particle size less than or equal to about the mean pore size of the pores 15 in the wall flow monolith. A coating of the first washcoat slurry is dispersed in the wall flow monolith so that the first washcoat slurry penetrates the porous walls. The wall flow monolith is then dried and calcined to fix the first washcoat 22 within the pores 15 of the porous walls 14 of the monolith.

A second washcoat slurry comprising the other of (1) a platinum group metal on refractory metal oxide support particles dispersed in water; or (2) zeolite and alumina dispersed in water is prepared. The second washcoat slurry has solids with a mean particle size greater than or equal to about the mean pore size of the pores 15. A coating of the second washcoat slurry is applied on the walls of the passages of the wall flow monolith. The wall flow monolith is dried and calcined to fix the second washcoat 24 on the surface 17 of the porous walls 14.

The second washcoat slurry can be used to coat either or both of the surface 17 of the inlet passages 16 or outlet passages 18. In some embodiments, the second washcoat slurry is coated on the surface 17 of the walls 14 of the inlet passages 16, resulting in the catalyzed soot filter (wall flow monolith 10) shown in FIG. 1. In one or more embodiments, the second washcoat slurry is coated on the surface 17 of the walls 14 of the outlet passages 18. In specific embodiments, the second washcoat slurry is coated on the surface 17 of the porous walls 14 of both the inlet passages 16 and the outlet passages 18. The second washcoat slurry can be modified so that the amount of zeolite, alumina and/or other components is different for the outlet passages 18 than for the inlet passages 16. The coating process for both the first washcoat and the second washcoat may be modified to include milling of the particles to adjust the $D_{90}$ depending on the porosity of the wall flow monolith employed.

In some embodiments, coating of the wall flow monolith comprises disposing the monolith in water and adding one or more solutions of platinum and palladium in a dropwise fashion. In some embodiments the water already contains one or more of the zeolite and the alumina. However, these components can be added after the monolith has been immersed and may be added at the same time or separately from other components (e.g., platinum and palladium).

In some embodiments, preparation of the washcoat slurry containing a platinum group metal on refractory metal oxide support particles comprises impregnating alumina support particles with one or more of a platinum solution and a palladium solution. The platinum and palladium can be impregnated at the same time or separately, and can be impregnated on the same support particles or separate support particles. In detailed embodiments, any or all of the impregnation procedures is accomplished by the incipient wetness technique.

The washcoat slurry containing zeolite and alumina may also include a platinum group metal including, but not limited to, platinum and palladium. Addition of a platinum group metal to the washcoat slurry containing zeolite and alumina may be of particular use when there is significant oxidation function needed. When the washcoat containing zeolite and alumina has a high platinum group metal composition, the catalyzed soot filter will act as a diesel oxidation catalyst.

In some detailed embodiments, the washcoat slurry containing zeolite and alumina further comprises at least one platinum group metal impregnated on an OSC. The platinum group metal can be any suitable platinum group metal including, but not limited to, platinum and palladium. The OSC material can be any suitable material including, but not limited to, ceria. In specific embodiments, the platinum group metal is palladium. The washcoat slurry containing zeolite and alumina may be prepared by impregnation of the OSC material with a palladium solution by an incipient wetness technique and dispersing the impregnated OSC in water before adding the zeolite and the alumina.

Detailed embodiments further comprise the addition of one or more of an associative thickener and a surfactant to the second washcoat slurry. An associative thickener can increase the viscosity of the second washcoat slurry. A surfactant is useful to reduce the surface tension of the slurry. The surfactant can be any suitable surfactant including anion, cationic, amphoteric and nonionic surfactants.

Emissions Treatment

Figure 4:
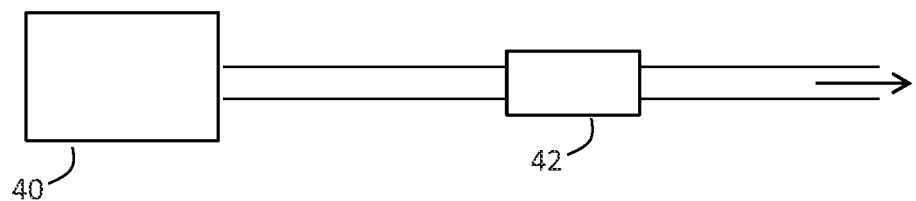
FIG. 4 shows a shows a schematic depiction of an embodiment of an emission treatment system in accordance with one or more embodiments of the invention.

In a basic configuration, as shown in FIG. 4, an exhaust treatment system comprises a catalyzed soot filter 42 positioned downstream of and in flow communication with a diesel engine 40. An exhaust gas stream comprising hydrocarbons, carbon monoxide and particulate matter is emitted by the engine 40. The exhaust gas stream passes through the downstream catalyzed soot filter 42.

In some embodiments, the exhaust gas stream is contacted with a second washcoat which is disposed on the walls of the catalyzed soot filter. The second washcoat comprises one of (1) a platinum group metal on refractory metal oxide support particles dispersed in water; or (2) zeolite and alumina dispersed in water. The exhaust has stream then contacts the first washcoat which permeates the walls of a wall flow monolith. The first washcoat comprises the other of (1) a platinum group metal on refractory metal oxide support particles dispersed in water; or (2) zeolite and alumina dispersed in water. In some embodiments, the exhaust gas stream contacts the second washcoat before the first washcoat. In specific embodiments, the exhaust gas stream contacts a second washcoat on the inlet side of the catalyzed soot filter, the first washcoat within the walls of the soot filter followed by the second washcoat again on the walls of the outlet side of the soot filter. In some embodiments the second washcoat on the outlet side of the soot filter is different from the second washcoat on the inlet side of the soot filter.

Some embodiments of the emissions treatment system further comprise one or more catalysts and/or catalytic articles positioned between the diesel engine and the catalyzed soot filter and in flow communication with both. In one or more embodiments, there is one or more catalysts and/or catalytic articles positioned downstream of and in flow communication with the catalyzed soot filter. Suitable optional catalytic components may include, but are not limited to, materials for the selective catalytic reduction of nitrogen oxides, ammonia oxidation, particulate filtration, NOx storage and/or trapping components, hydrocarbon, reduction/oxidation components and reductant injectors. The preceding list of catalytic articles is merely illustrative and should not be taken as limiting the scope of the invention.

EXAMPLES

The following examples further illustrate the present invention, but of course, should not be construed as in any way limiting its scope. For example, while examples are provided for aluminum titanate and cordierite wall flow filters, it is expected that silicon carbide filters would show similar results in accordance with the examples described herein.

Examples 1 to 3

Examples 1 through 3 were prepared on similar filter substrates made of Cordierite with a porosity of 50% and a mean pore size of 19 μm. The cell density was 300 cells per square inch and the wall thickness was 13 mil. The substrate has a dimension of 1.5" (diameter)×6" (length) round. The substrate had an asymmetric design, that is, the inlet channels have a larger opening area than the outlet channels.

Each of Examples 1 through 3 had the same composition but were made with different processes as described below. Each Examples consists of 20 g/ft$^3$ Pt, 20 g/ft$^3$ Pd, 0.25 g/in$^3$ Al$_2$O$_3$, 0.2 g/in$^3$ beta zeolite and 0.15 g/in$^3$ OSC. The OSC was a mixture consisting of 45% CeO$_2$, 45% ZrO$_2$, 8% La$_2$O$_3$ and 2% Pr$_6$O$_{11}$. The composition was the same through the length of the filter substrates. The alumina powder used these Examples 1 through 3 had a D$_{90}$ of 6 μm. Each of Examples 1 through 3 were aged at 700° C. for 4 hours

Example 1

A platinum tetra monoethanolamine hydroxide solution (20 g/ft$^3$) was impregnated onto the alumina powder with the incipient wetness technique. A palladium nitrate solution (10 g/ft$^3$) was impregnated onto the alumina support in the same manner. Separate, palladium (10 g/ft$^3$) was impregnated on the OSC component. The two powders were then physically mixed and dispersed in water to make a slurry. Beta zeolite was then added to the slurry. The final slurry had a solid content of 16%, pH 2.5 and a viscosity of 2 cP.

The slurry was then washcoated by immersing the substrate into the slurry with the inlet side of the substrate down and the outlet side just above (about ¼ inch) the slurry level. The substrate was removed from the slurry and a stream of air was blown from the outlet side until no washcoat slurry was coming out. The coated sample was then dried at 110° C. for 2 hours and calcined in air at 450° C. for 1 hour.

Example 2

A platinum tetra monoethanolamine hydroxide solution (20 g/ft$^3$) was first impregnated onto the alumina powder with the incipient wetness technique. Then, a palladium nitrate solution (10 g/ft$^3$) was impregnated onto the alumina support in the same manner. The Pt/Pd impregnated alumina was dispersed into water to make a first washcoat slurry with a solid content of 7%, pH 3.7 and viscosity of 2 cP. The first washcoat slurry was then washcoated onto the substrate in the same manner as Example 1.

Palladium (10 g/ft$^3$) was impregnated onto the OSC component. The Pd impregnated OSC powder was dispersed into water to make a second washcoat slurry. Beta zeolite was added to the second washcoat slurry. The second washcoat slurry had a solid content of 10%, pH 1.7 and viscosity of 2 cP. The substrate was then washcoated with the second washcoat slurry, dried and calcined in the same manner as Example 1.

Example 3

The substrate was washcoated with the first washcoat slurry of Example 2 and dried/calcined in the same manner. Palladium (10 g/ft$^3$) was impregnated onto the OSC component. The Pd impregnated OSC powder was dispersed into water to make a second washcoat slurry. Beta zeolite was added to the second washcoat slurry. Pre-milled alumina (0.03 g/in$^3$) and alumina colloidal binder (0.02 g/in$^3$) were added to the second washcoat slurry to improve adhesion of the washcoat. A 20% associative thickener was added to improve rheology of the washcoat and 1% surfactant was added to reduce surface tension. This second washcoat slurry had a solid content of 11%, pH 19 and viscosity of 2 cP. The substrate was then washcoated with the second washcoat slurry, dried and calcined in the same manner as Example 1.

Examples 4 to 5

The filter substrate used for Examples 4 and 5 was made of cordierite with a porosity of 50% and a mean pore size of 23 μm. The cell density was 250 cell per square inch and the wall thickness was 15 mil. The substrate had a dimension of 1.5" (diameter)×6" (length) round. The alumina was the same as that of Examples 1-3. Each of Examples 4 and 5 were aged at 750° C. for 4 hours.

Example 4

Alumina powder was first dispersed into water to make a slurry with about 20% solids. A platinum solution was added to the slurry drop-wise with good stirring. Palladium was then added in the same manner. Beta zeolite was added to the slurry last. The slurry was finally diluted based on a coating target which had a solid content of 10%, pH 3.6 and viscosity of 14 cP. The slurry was then washcoated onto the substrate in the same manner as Example 1. Example 4 had a composition of 3.33 g/ft$^3$ Pt, 1.67 g/ft$^3$ Pd, 0.1 g/in$^3$ Al$_2$O$_3$ and 0.1 g/in$^3$ beta zeolite.

Example 5

Alumina powder was first dispersed into water to make a first washcoat slurry with about 20% solids. A platinum solution was added to the slurry drop-wise with good stirring. Palladium was then added in the same manner. The slurry was finally diluted based on a coating target which had a solid content of 4%, pH 4.3 and viscosity of 2 cP. The first washcoat slurry was then washcoated onto the substrate in the same manner as Example 1.

A second washcoat slurry was prepared by dispersing beta zeolite into water. Pre-milled alumina (0.03 g/in$^3$) and alumina colloidal binder (0.02 g/in$^3$) were added into the slurry to improve adhesion of the washcoat. The slurry was milled with a continuous mill to D$_{90}$ of 20 μm. A 20% associative thickener was used to improve rheology and a 1% surfactant was added to reduce the surface tension. The second washcoat slurry had a solid content of 5%, pH 3.8 and viscosity of 2 cP. The substrate was washcoated with the second washcoat slurry, dried and calcined in the same manner as Example 1. Example 5 had a composition of 3.33 g/ft$^3$ Pt, 1.67 g/ft$^3$ Pd on 0.1 g/in$^3$ Al$_2$O$_3$, 0.1 g/in$^3$ beta zeolite and 0.05 g/in$^3$ alumina binder.

Testing Conditions

All Examples were tested in a laboratory reactor with a feed gas having 1000 ppm CO, 420 ppm HC (on the C$_1$ basis), 100 ppm No, 10% O$_2$, 7% H$_2$O, 5% CO$_2$. The hydrocarbon was made up of equal portions of propene, toluene and decane. The gas hourly space velocity (GHSV) was 35,000 hr$^{-1}$. The light-off temperatures for each of these Examples is listed in Table 1 and FIGS. 5-8 show relevant graphs.

TABLE 1

| Example | CO T$_{50}$ (° C.) | HC T$_{50}$ (° C.) |
|---|---|---|
| 1 | 150 | 161 |
| 2 | 141 | 151 |
| 3 | 135 | 144 |
| 4 | 197 | 223 |
| 5 | 175 | 215 |

Figure 5:
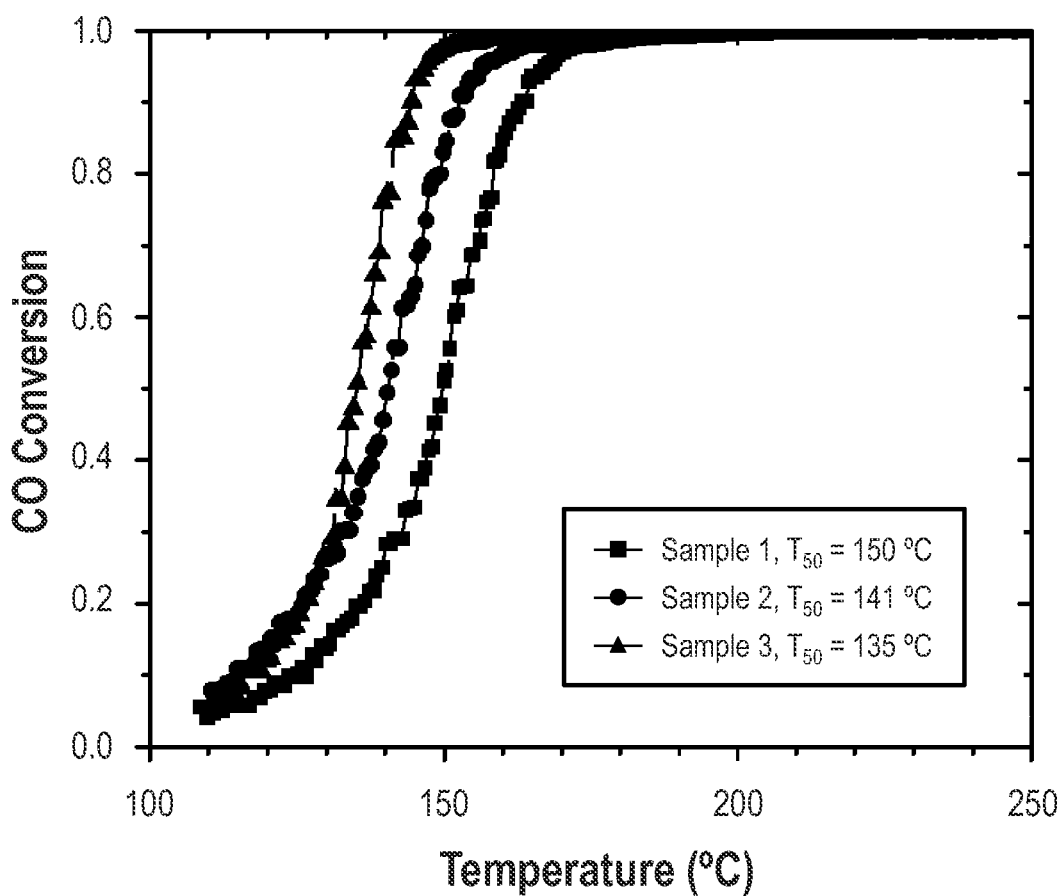
FIG. 5 shows a graph of the CO conversion as a function of temperature for Examples 1-3.
Figure 6:
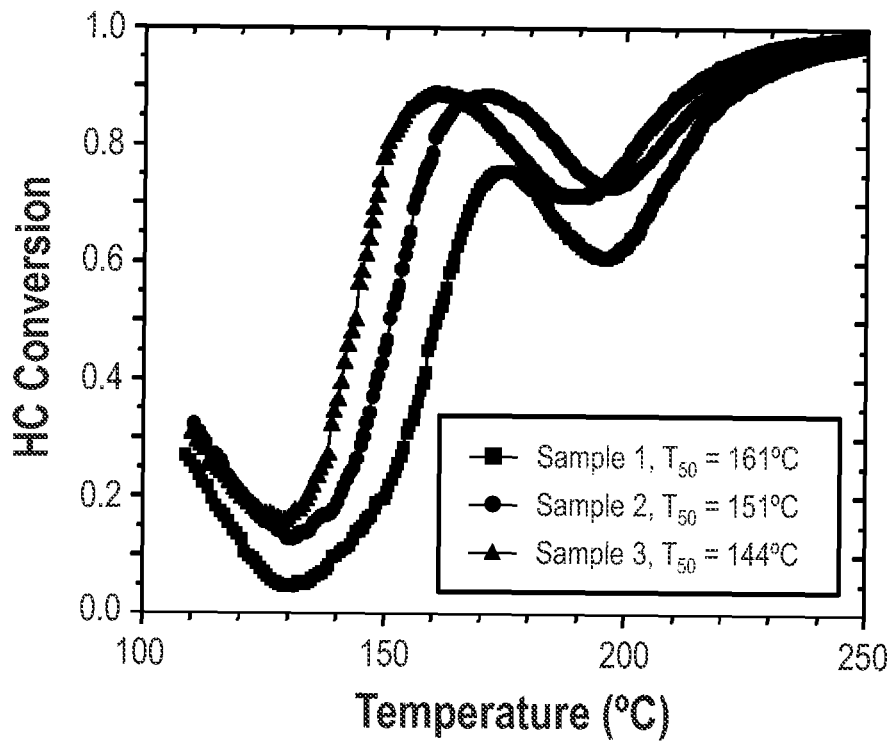
FIG. 6 shows a graph of the hydrocarbon conversion as a function of temperature for Examples 1-3.

FIG. 5 shows a graph of the CO conversion as a function of temperature for Examples 1 to 3. FIG. 6 shows a graph of the hydrocarbon conversion as a function of temperature for Examples 1 to 3. It can be seen from both of these graphs that Examples 2 and 3, which were made according to one or more of the embodiments described herein, had a lower light-off temperature ($T_{50}$) than Example 1, which had a single washcoat.

Figure 7:
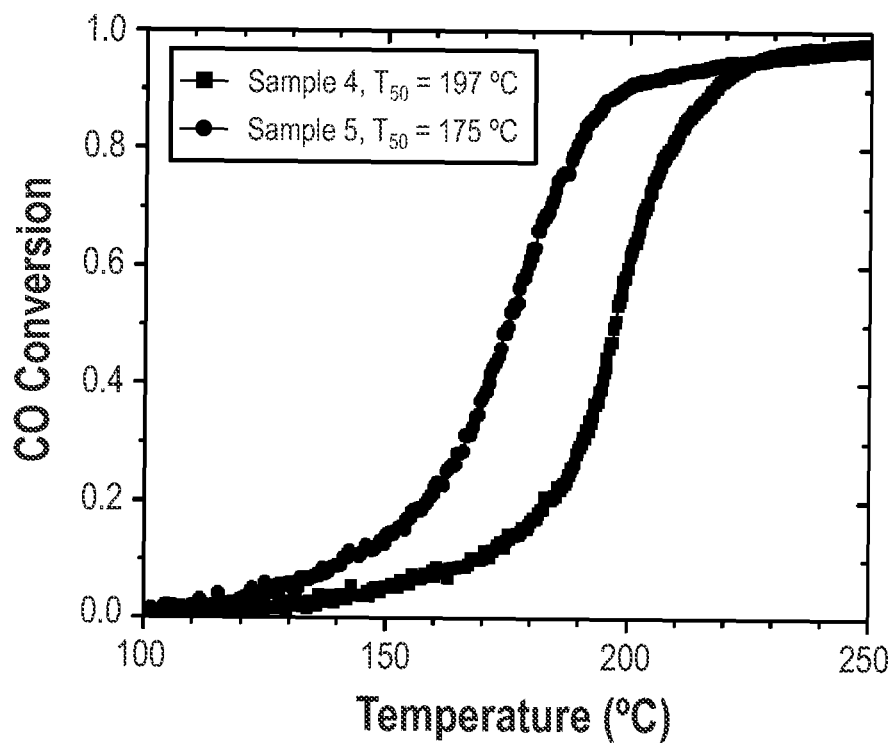
FIG. 7 shows a graph of the CO conversion as a function of temperature for Examples 4-5.
Figure 8:
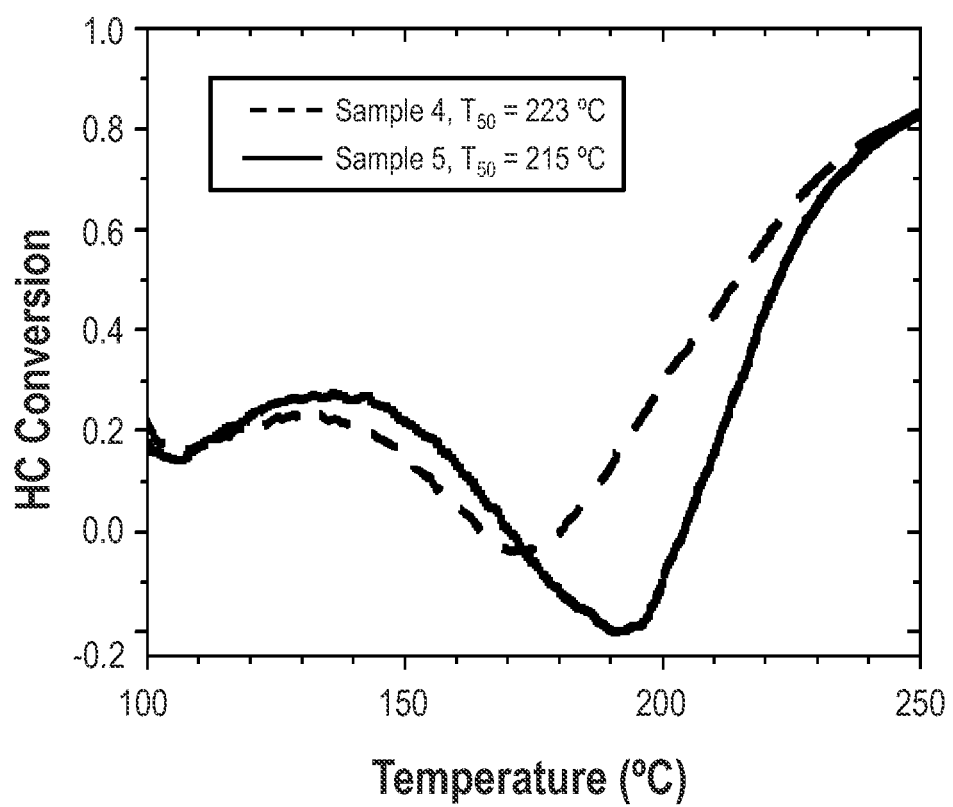
FIG. 8 shows a graph of the hydrocarbon conversion as a function of temperature for Examples 4-5.

FIG. 7 shows a graph of the CO conversion as a function of temperature for Examples 4 and 5. FIG. 8 shows a graph of the hydrocarbon conversion as a function of temperature for Examples 4 and 5. It can be seen from both of these graphs that Example 5, which was made according to one or more embodiments described herein, had a lower light-off temperature than Example 4, which had a single washcoat.

Accordingly, one or more embodiments of the invention are directed to catalyzed soot filters having a carbon monoxide light off temperature and a hydrocarbon light off temperature greater than about 10° C. lower than those of a catalyzed soot filter having a similar composition in a single washcoat layer after both filters are aged for about four hours at about 700° C.

Detailed embodiments of the catalyzed soot filter exhibit a $T_{50}$ for carbon monoxide of less than about 140° C. when the filter has been aged at about 700° C. for about four hours and tested in a flow reactor system with a feed containing 1000 ppm CO, 420 ppm hydrocarbons on a C1 basis, 100 ppm NO, 10% $O_2$, 7% water, 5% $CO_2$ with the balance made up of $N_2$, the hydrocarbon makeup being about equal portions of propene, toluene and decane on the C1 basis. Specific embodiments of the catalyzed soot filter exhibit a $T_{50}$ for hydrocarbons of less than about 150° C. when the filter has been aged at about 700° C. for about four hours and tested in a flow reactor system with a feed containing 1000 ppm CO, 420 ppm hydrocarbons on a C1 basis, 100 ppm NO, 10% $O_2$, 7% water, 5% $CO_2$ with the balance made up of $N_2$, the hydrocarbon makeup being about equal portions of propene, toluene and decane on the C1 basis.

Accordingly, while the present invention has been disclosed in connection with various embodiments thereof, it should be understood that other embodiments might fall within the spirit and scope of the invention, as defined by the following claims.

Reference throughout this specification to "one embodiment," "certain embodiments," "one or more embodiments" or "an embodiment", means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalyzed soot filter comprising:
   a wall flow monolith having a plurality of longitudinally extending passages formed by longitudinally extending porous walls bounding and defining said passages, the passages comprising inlet passages having an open inlet end and closed outlet end, and outlet passages having a closed inlet end and an open outlet end;
   a first washcoat permeating the walls of the wall flow monolith; and
   a second washcoat disposed on the walls of the passages of the wall flow monolith, wherein the first washcoat comprises one of (1) platinum and palladium on refractory metal oxide support particles or (2) zeolite and alumina; and the second washcoat comprises the other of (1) platinum and palladium on refractory metal oxide support particles or (2) zeolite and alumina.

2. The catalyzed soot filter of claim 1, wherein the second washcoat comprises zeolite and alumina and is disposed on the walls of the inlet passages.

3. The catalyzed soot filter of claim 1, wherein the second washcoat comprises zeolite and alumina and is disposed on the walls of the outlet passages.

4. The catalyzed soot filter of claim 1, wherein the platinum is present in the first washcoat with a loading in a range of about 0.5 g/ft$^3$ and about 80 g/ft$^3$.

5. The catalyzed soot filter of claim 1, wherein the palladium is present in the first washcoat with a loading in a range of about 0.5 g/ft$^3$ and about 80 g/ft$^3$.

6. The catalyzed soot filter of claim 1, wherein the second washcoat comprising zeolite and alumina comprises zeolite in a range of about 0.05 g/in$^3$ to about 0.3 g/in$^3$ and alumina in a range of about 0.2 g/in$^3$ to about 0.5 g/in$^3$.

7. The catalyzed soot filter of claim 1, wherein the second washcoat comprising zeolite and alumina further comprises palladium supported on an oxygen storage component (OSC).

8. The catalyzed soot filter of claim 7, wherein the palladium is present with a loading in a range of about 0.5 g/ft$^3$ and about 30 g/ft$^3$.

9. The catalyzed soot filter of claim 1, wherein the wall flow monolith comprises cordierite having a porosity in a range of about 40% to about 70% and a mean pore size in a range of about 10 μm and 30 μm.

10. An exhaust treatment system comprising a diesel engine in flow communication with the catalyzed soot filter of claim 1.

11. The exhaust treatment system of claim 10, further comprising one or more catalysts positioned between the diesel engine and the catalyzed soot filter and in flow communication with both.

12. The exhaust treatment system of claim 10, further comprising one or more catalysts positioned downstream of and in flow communication with the catalyzed soot filter.

13. The exhaust treatment system of claim 10, wherein the second washcoat comprises zeolite in a range of about 0.05 g/in$^3$ to about 0.3 g/in$^3$ and alumina in a range of about 0.2 g/in$^3$ to about 0.5 g/in$^3$.

14. The exhaust treatment system of claim 10, wherein the second washcoat further comprises palladium supported on an oxygen storage component (OSC).

15. The exhaust treatment system of claim 14, wherein the palladium is present with a loading in a range of about 0.5 g/ft$^3$ and about 30 g/ft$^3$.

* * * * *